(12) United States Patent
Caves et al.

(10) Patent No.: US 6,891,833 B1
(45) Date of Patent: May 10, 2005

(54) ELIMINATION OF PREMATURE BLOCKING IN COMMUNICATIONS NETWORKS

(75) Inventors: Keith Caves, Herts (GB); Simon Brueckheimer, London (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/505,474

(22) Filed: Feb. 16, 2000

(51) Int. Cl.[7] .............................. H04L 12/28
(52) U.S. Cl. .................... 370/395.2; 370/230
(58) Field of Search ................ 370/395.1, 395.2, 370/395.3, 230, 236, 410, 522

(56) References Cited

U.S. PATENT DOCUMENTS

| | | | |
|---|---|---|---|
| 5,511,076 A | * | 4/1996 | Ramakrishnan et al. .... 370/423 |
| 6,128,659 A | * | 10/2000 | Subblah et al. ............. 709/225 |
| 6,243,382 B1 | * | 6/2001 | O'Neill et al. ......... 370/395.52 |
| 6,307,836 B1 | * | 10/2001 | Jones et al. ................. 370/230 |
| 6,317,432 B1 | * | 11/2001 | Ono et al. ............... 370/395.2 |
| 6,480,492 B1 | * | 11/2002 | Lundback et al. ....... 370/395.1 |

FOREIGN PATENT DOCUMENTS

| | | |
|---|---|---|
| WO | WO 99/31926 | 6/1999 |
| WO | WO 99/44389 | 9/1999 |

OTHER PUBLICATIONS

ATM User–Network Interface Specification, Version 3.1, Sep., 1994.*

* cited by examiner

*Primary Examiner*—Chi Pham
*Assistant Examiner*—Keith M. George
(74) *Attorney, Agent, or Firm*—Barnes & Thornburg

(57) ABSTRACT

In a communications network, a virtual channel connection is established between first and second nodes in a communications network using a negotiating procedure to determine a mutually acceptable path identifier. The first node sends a connection request to the second node incorporating a path identifier for a virtual channel to be used for the connection. The second node determines whether the path identifier is acceptable for establishing the connection, and if so returns an acceptance message. If the path identifier is not acceptable to the second node, this node returns a negotiation request message incorporating a new path identifier for an alternative virtual channel to be used for the connection.

14 Claims, 11 Drawing Sheets

ELIMINATION OF PREMATURE BLOCKING IN COMMUNICATIONS NETWORKS

FIELD OF THE INVENTION

This invention relates to arrangements and methods for avoidance of premature blocking during call set-up in a communications network.

BACKGROUND OF THE INVENTION

A recent development in communications technology has been the introduction of asynchronous transfer mode (ATM) networks. Such networks are connectionless in nature and transport traffic in cells which are routed over virtual channel connections. These broadband networks, which were originally developed for transporting data traffic, are now being used for the transport of narrow band voice traffic. It will of course be understood that voice transport presents particular problems as the traffic must be carried end to end in real time and with a guaranteed quality of service. A number of techniques have been developed to address these issues, for example the introduction of ATM Adaptation Layer Two (AAL2) in which voice traffic from a number of users is multiplexed into minicells transported in ATM cells. These techniques will be familiar to those skilled in the art.

A further problem with carrying voice traffic over an asynchronous network is that of setting up calls in response to user demand. When a call is set up, network resources must be allocated and reserved for that call to ensure that the guaranteed quality of service can be supported.

In an ATM network, calls are established between service endpoints over ATM virtual channel connections (VCCs). Individual VCCs may support calls by means of ATM Adaptation Layer Type One (AAL1), ATM Adaptation Layer Type Two (AAL2), ATM Adaptation Layer Type Three/Four (AAL3/4) or ATM Adaptation Layer Type Five (AAL5). In particular, the use of AAL2 is advantageous in situations where voice information is compressed/decompressed at the service endpoints. This results in short packets of information per voice call such that multiple voice calls can be multiplexed on to a single AAL2 VCC with concomitant savings in bandwidth.

It will be appreciated that, before a connection request can be admitted to the network, an appropriate channel must first be allocated to the request. This is typically performed by a negotiation procedure between an originating and a terminating end point. Under certain conditions, it is possible for a channel selected for a call by one end point to be unacceptable to the other. Typically such a situation occurs when the particular channel that has been chosen does not terminate on an appropriate resource at the terminating endpoint that would allow the call request to be satisfactorily completed. In such circumstances the call set up procedure will have to be aborted, even if there exist other usable channels that terminate on a resource that would have permitted the call to be completed. This situation is defined as premature blocking. The volume of aborted call set up attempts resulting from premature blocking can represent a significant waste of the network resources involved in the failed set up attempts as well as a loss of revenue to a network operator.

SUMMARY OF THE INVENTION

An object of the invention is to minimize or to overcome the above disadvantage.

A further object of the invention is to provide an improved method of path identifier selection for establishing a virtual channel connection in a communications network.

According to a first aspect of the invention, there is provided a method of establishing a virtual channel connection between first and second nodes in a communications network, the method comprising negotiating between said first and second nodes whereby to determine a mutually acceptable path identifier for a virtual channel to be used for the connection.

According to a further aspect of the invention, there is provided a method of establishing a virtual channel connection between first and second nodes in a communications network, the method comprising;
 at the first node, sending a connection request to the second node, said request incorporating a path identifier for a virtual channel to be used for the connection;
 at the second node, determining whether the path identifier is acceptable to the second node for establishing the connection; and
 at the second node, where said path identifier is not acceptable to the second node, returning to the first node a negotiation request message incorporating a new path identifier for an alternative virtual channel to be used for the connection According to another aspect of the invention, there is provided an arrangement for establishing a virtual channel connection between first and second nodes in a communications network, the arrangement comprising first and second signalling server means disposed respectively at said first and second nodes, said signalling server means being arranged to perform a negotiation responsive to a connection request whereby to determine a mutually acceptable path identifier for a virtual channel to be used for the connection.

According to a further aspect of the invention, there is provided an arrangement for establishing a virtual channel connection between first and second nodes in a communications network, the arrangement comprising:
 first signalling server means at the first node for sending a connection request over a signalling channel to the second node, said request incorporating a path identifier for a virtual channel to be used for the connection;
 second signalling server means at the second node for determining whether the path identifier is acceptable to the second node for establishing the connection; and,
 where said path identifier is not acceptable to the second node, for returning to the first node a negotiation request message incorporating a new path identifier for an alternative virtual channel to be used for the connection According to another aspect of the invention, there is provided a communications network node incorporating a plurality of port and switch modules, and a signalling server whereby virtual channel connections may be established via said port and switch modules and an adjacent network node, wherein said port and switch modules are arranged each to handle a proportion of the total aggregated traffic transported between the network node and the adjacent network node.

Sharing the aggregated traffic between the port and switch modules results in fewer ports between the modules and the switch with concomitant lower complexity and lower cost for both the modules and the switch, while avoiding premature call blocking.

BRIEF DESCRIPTION OF THE DRAWINGS

Embodiments of the invention will now be described with reference to the accompanying drawings in which.

DESCRIPTION OF PREFERRED EMBODIMENT

Figure 1:
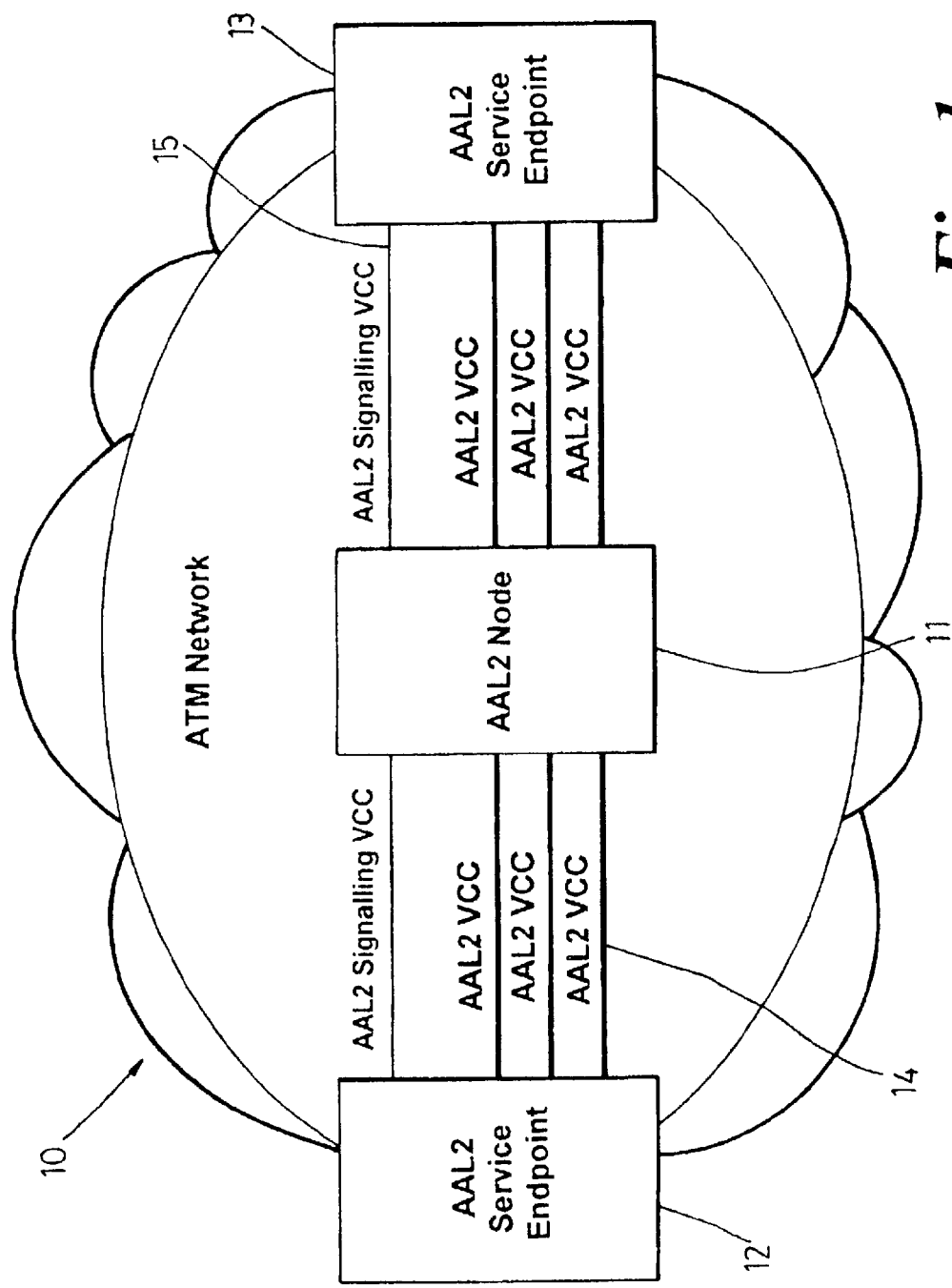
FIG. 1 shows a typical ATM network arrangement in schematic form.

Referring first to FIG. 1, which is introduced for explanatory and comparative purposes, this figure shows a simple arrangement of three AAL2 nodes (11, 12 and 13), comprising two AAL2 service endpoints 12, 13 connected via a single intermediate AAL2 node 11 over an ATM network 10 using AAL2 VCCs 14 to transport user information. Typically these end points will interface with narrow band networks (not shown) carrying voice traffic.

In the network arrangement of FIG. 1, each AAL2 VCC 14 is typically capable of supporting up to two hundred and forty eight individual AAL2 connections for the transport of user information. The AAL2 connections are multiplexed into ATM cells carried by the AAL2 VCCs. An AAL2 signalling protocol is available for controlling the establishment and release of AAL2 connections. As shown in FIG. 1, this signalling protocol may be transported between AAL2 service endpoints and adjacent AAL2 nodes over an AAL2 signalling VCC 15. The signalling VCC uses the ATM Adaptation layer Type 5 (AAL5) in conjunction with the standard Signalling AAL (SAAL) in order to transport the AAL2 signalling information reliably between AAL2 nodes. Using this form of signalling transport, three situations are possible:

- A single AAL5 signalling VCC controls all of the AAL2 connections carried in multiple AAL2 VCCs.
- A single AAL5 signalling VCC controls all of the AAL2 connections carried in single AAL2 VCC—thus there are as many AAL5 signalling VCCs as there are AAL2 VCCs.
- A number of AAL5 signalling VCCs controls the AAL2 connections in a different number of AAL2 VCCs—this situation is basically covered by one or both of the first two situations described and is not discussed further.

Alternatively, the AAL2 signalling protocol may be transported over one of the AAL2 connections provided by the AAL2 VCCs. This is in conjunction with the segmentation and re-assembly service specific convergence sublayer (SAR-SSCS) for AAL2, which provides an assured mode of service for the type of packet mode data that constitutes AAL2 signalling messages. Using this form of signalling transport, again three situations are possible:

- A single AAL2 connection carrying AAL2 signalling controls all of the AAL2 user traffic connections carried in multiple AAL2 VCCs.
- A single AAL2 connection carrying AAL2 signalling controls all of the AAL2 user traffic connections carried in the AAL2 VCC with which it is associated—thus there is one AAL2 signalling connection per AAL2 VCC.
- A number of AAL2 connections carrying AAL2 signalling control the AAL2 user traffic connections carried in a different number of AAL2 VCCs—this situation is basically covered by one or both of the first two situations described and is not discussed further.

In the following, two signalling scenarios for the control of AAL2 user traffic connections in the network of FIG. 1 are considered:

Case 1

Here a single AAL2 signalling channel exists between adjacent AAL2 nodes. This signalling channel is provided by a single AAL5 VCC, which is used to carry AAL2 signalling for the control of AAL2 user traffic connections in all the AAL2 VCCs between the two nodes. Note that, for the purposes of this document, this case is identical with that in which a single AAL2 connection is used to carry AAL2 signalling for the control of AAL2 user traffic connections in multiple AAL2 VCCs.

Case 2

An AAL2 signalling channel exists per AAL2 VCC between adjacent AAL2 nodes. This is provided by a single AAL2 connection per AAL2 VCC, which is used to carry AAL2 signalling for the control of AAL2 user traffic connections carried in that VCC only. Note that, for the purposes of this document, this case is identical with that in which an AAL5 VCC is provided per AAL2 VCC in order to carry AAL2 signalling for the control of AAL2 user traffic connections in each AAL2 VCC.

As shown in FIG. 1, multiple AAL2 VCCs 14 may exist between adjacent AAL2 nodes. During the connection establishment phase of an AAL2 call, the Establish Request (ERQ) message is conveyed by AAL2 signalling from the originating AAL2 service endpoint towards the terminating AAL2 endpoint. As already noted, a single AAL2 signalling channel carried on one of the ATM VCCs may control AAL2 connections on multiple AAL2 VCCs. For this reason, there is included in the ERQ message a connection element identifier (CEID) parameter, comprising a path identifier field plus a channel identifier (CID) field. The path identifier field identifies an AAL2 Path (i.e. the AAL2 VCC that is to carry the AAL2 channel), while the CID field identifies an AAL2 channel within that path to be used for the call.

A major drawback with the above signalling procedure for call establishment is that, if the AAL2 VCC indicated in the ERQ message is not acceptable to the receiving AAL2 node, the call attempt must be terminated. This applies even if one of the other AAL2 VCCs between the two AAL2 nodes would have been acceptable to the receiving node. Having introduced the background for a better understanding of the invention, preferred exemplary embodiments of the invention and the best method of performing the invention will now be described below with reference to FIGS. 2 to 10.

The rationale for the ability to negotiate the path identifier carried by the connection element identifier (CEID) parameter of the initial AAL2 signalling establishment request (ERQ) message is set out in the following three subsections.

Load Sharing

Case 1—Single Signalling Channel between Adjacent Nodes

Figure 2:
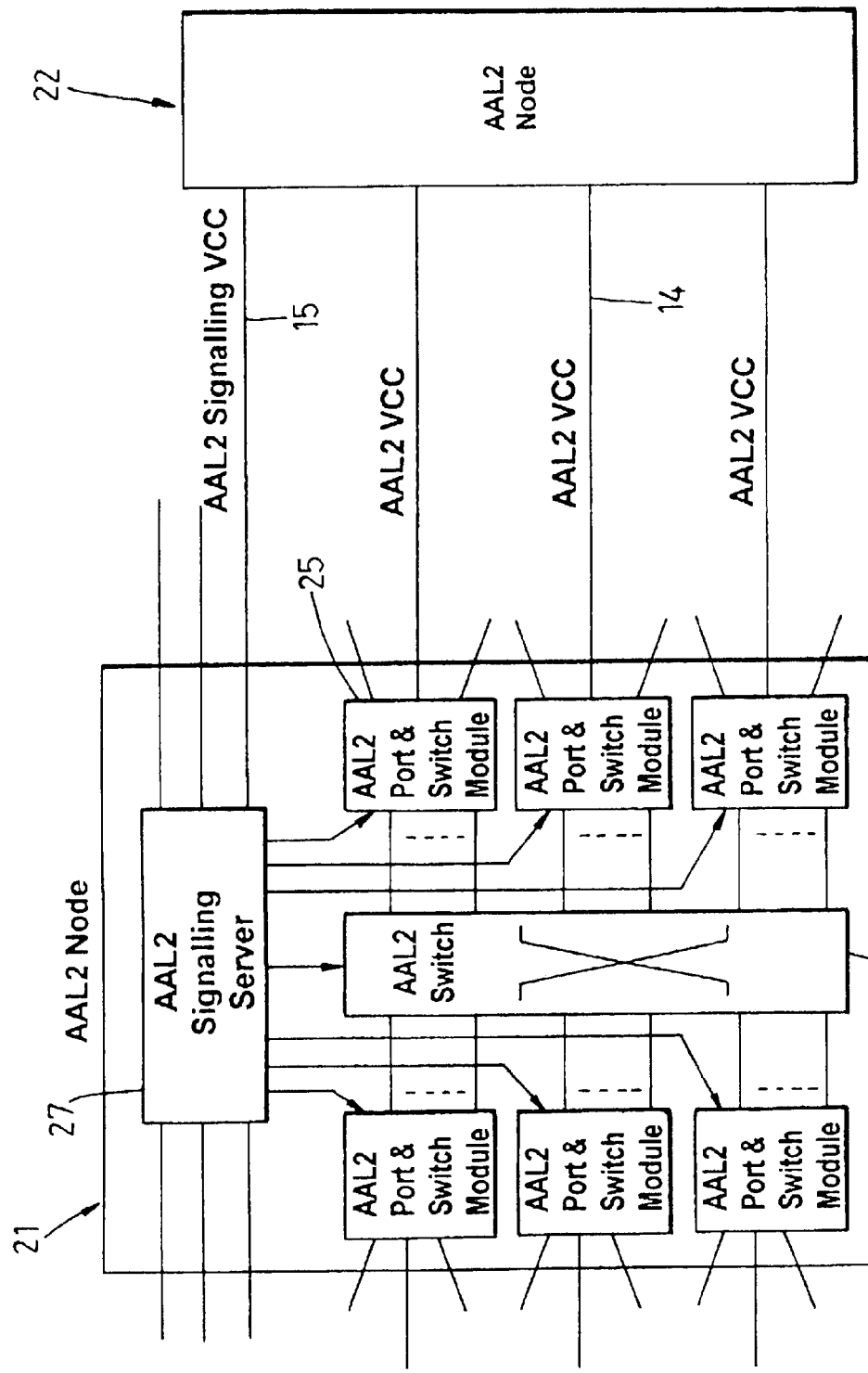
FIG. 2 shows an ATM node construction according to a first embodiment of the invention.

Referring now to FIG. 2, this depicts a preferred embodiment of the invention in which single signalling channel is provided between adjacent AAL2 nodes 21, 22. For clarity, only one node (21) is shown in detail. FIG. 2 shows the essential elements that illustrate the arrangement for an example of load sharing at an AAL2 node 21 that terminates a single AAL2 signalling channel 15 for each adjacent AAL2 node 22. The AAL2 node is shown to include a number of AAL2 port and switch modules 25, a central AAL2 switch 26 and an AAL2 signalling server 27. The AAL2 modules 25 each terminate a number of AAL2 VCCs carrying user traffic. The AAL2 signalling server 27 handles an AAL2 signalling channel between the AAL2 node 21 and each adjacent AAL2 node 22. Under the control of the signalling server 27, the AAL2 port and switch modules 25 switch individual AAL2 connections between the AAL2 VCCs 14 terminated by the modules and the available inputs and outputs on the central AAL2 switch 26. The central AAL2 switch 26 then switches AAL2 connections between AAL2 nodes 21 and 22, as instructed by the AAL2 signalling server 27, according to the routing requirements of the individual calls.

The AAL2 port and switch modules 25 are designed such that, if the maximum number of AAL2 connections were present on each VCC terminated by a module, blocking would occur. Thus, in the exemplary embodiment of FIG. 2 where each AAL2 module 25 terminates three AAL2 VCCs, the maximum number of AAL2 connections that could be carried would be seven hundred and forty four (248×3). However, the modules are advantageously designed to accommodate less than this number, typically six hundred AAL2 connections. This is done deliberately because, in this example, the aggregate number of AAL2 connections expected on all VCCs terminating on the three AAL2 modules during the busy hour has been calculated to be no greater than eighteen hundred. Thus, the demand for AAL2 switched connections can be met provided that it is shared equitably among all AAL2 modules. In other words, load sharing is particularly preferred for optimum operation of the AAL2 node, particularly in the avoidance of blocking by individual AAL2 modules.

Clearly, from time to time the request for AAL2 connections on a given AAL2 module will exceed that module's capacity, while spare capacity is available on the other modules. To avoid blocking in a given module, with consequent rejection of call attempts, the AAL2 signalling server 27 is able to negotiate with its peers in the adjacent nodes. The aim of this negotiation is to ensure that new AAL2 connection requests that terminate on a module without spare capacity, and which would otherwise be rejected, may be directed on to an appropriate AAL2 VCC that terminates on a module with spare capacity. In other words, the aim of the negotiation is to achieve load sharing. This requires that the AAL2 signalling server 27 is able to request, on appropriate occasions, a different path identifier from the one contained in the initial ERQ signalling message.

In the arrangement of FIG. 2, the AAL2 port and switch modules may advantageously be optimised each to handle a proportion of the total aggregated traffic transported between the two interconnected AAL2 nodes by the AAL2 VCCs, rather than the maximum traffic capable of being transported on the VCCs terminating on each module. This typically results in fewer ports between the modules and the AAL2 switch with concomitant lower complexity and lower cost for both the modules and the AAL2 switch, while avoiding premature call blocking.

Advantageously, the negotiation procedure may be controlled via software on a storage medium in machine readable form installed in the signalling server.

Case 2—AAL2 Signalling Channel per AAL2 VCC

Figure 3:
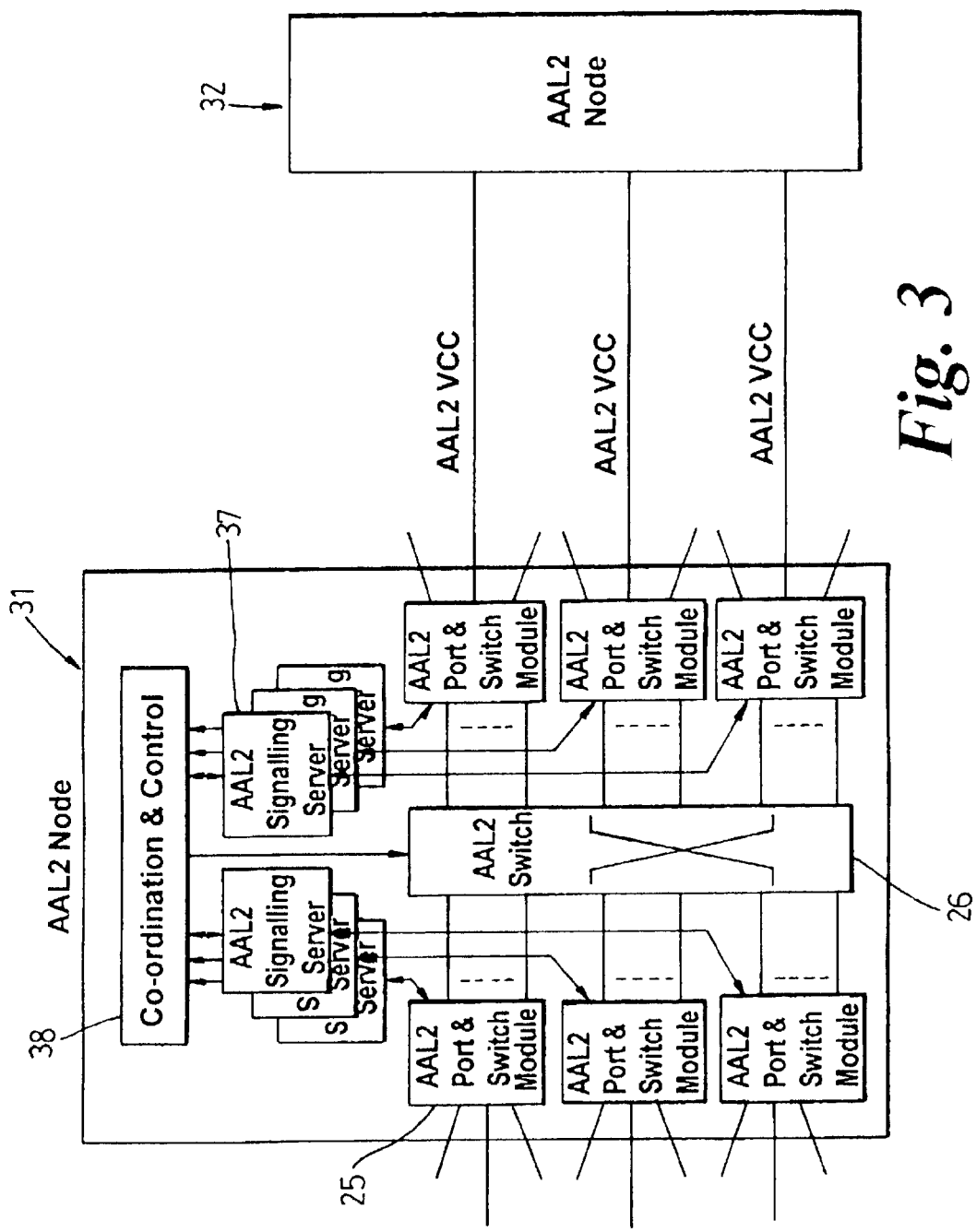
FIG. 3 shows an ATM node construction according to a further embodiment of the invention.

FIG. 3 shows the essential elements of an alternative embodiment and illustrates the arrangement for an example of load sharing at an AAL2 node 31 that terminates an AAL2 signalling channel for each AAL2 VCC. The AAL2 node 31 is shown to include a number of AAL2 port and switch modules 25, a central AAL2 switch 26, an AAL2 signalling server 37 per AAL2 module and a co-ordination and control element 38. The AAL2 modules each terminate a number of AAL2 VCCs 14 carrying user traffic. Each AAL2 signalling server handles the AAL2 signalling channels associated with the AAL2 VCCs terminated by a given AAL2 module. The co-ordination and control element 38 communicates with the AAL2 signalling servers 25 and with the central AAL2 switch 26 to control the switching of AAL2 connections in the node. Under the control of the signalling servers, the AAL2 port and switch modules 25 switch individual AAL2 connections between the AAL2 VCCs terminated by the modules and the available inputs and outputs on the central AAL2 switch 26. The central AAL2 switch then switches AAL2 connections between AAL2 modules, as instructed by the co-ordination and control element 38, according to the routing requirements of the individual calls.

As described for the previous example of FIG. 2 above, the AAL2 port and switch modules 25 of FIG. 3 may block if the number of AAL2 connections present simultaneously on the VCCs terminated exceeds the switching capacity of those modules. It must be expected that, from time to time, the request for AAL2 connections on a given AAL2 module will exceed that module's capacity, while spare capacity is available on the other modules. To avoid blocking in a given module, with consequent rejection of call attempts, the AAL2 signalling servers 37 are able to negotiate with their peers in the adjacent nodes 32, as directed by the co-ordination and control element. This is so as to ensure that new AAL2 connection requests that terminate on a module without spare capacity, and which would otherwise be rejected, may be directed on to an appropriate AAL2 VCC that terminates on a module with spare capacity. The aim of the negotiation procedure is thus to achieve load sharing. This requires that the co-ordination and control element can direct each AAL2 signalling server to request, on appropriate occasions, a different path identifier than the one contained in the initial ERQ signalling message.

ATM Port Isolation

Case 1—Single Signalling Channel Between Adjacent AAL2 Nodes

Figure 4:
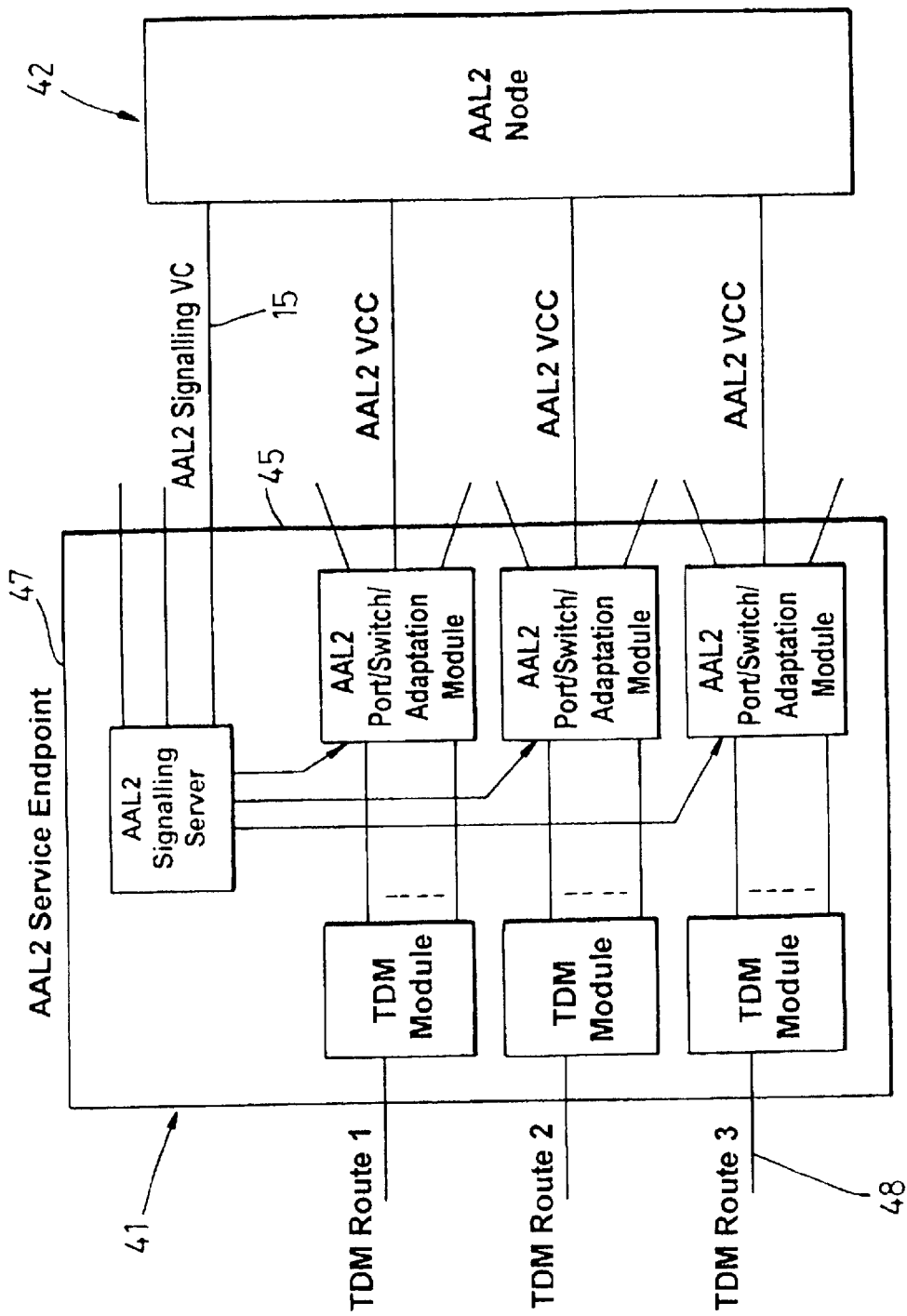
FIG. 4 shows the construction of an ATM service end point.

FIG. 4 illustrates an example of port isolation at an AAL2 service endpoint node 41 that terminates a single AAL2 signalling channel for each adjacent AAL2 node 22. Port isolation is a situation that exists in the AAL2 service endpoint wherein a given ATM port (AAL2 VCC) 45 may only be connected to a single TDM route, effectively isolating that port from any other TDM routes.

FIG. 4 illustrates a means for implementing an AAL2 service endpoint in which direct connections may be made between the ports of the AAL2 port and switch modules and the ports of the TDM modules without loss of connectivity. This typically removes the need to interpose a switch between the AAL2 and TDM modules to provide connectivity between any AAL2 module and any TDM module, thereby reducing the cost and complexity of the AAL2 service endpoint, while avoiding premature call blocking.

The AAL2 service endpoint is shown to include a number of AAL2 port/switch/adaptation modules 45, a number of TDM modules 46 and an AAL2 signalling server 47. The AAL2 modules 45 each terminate a number of AAL2 VCCs 14 carrying user traffic. The AAL2 signalling server 47 handles an AAL2 signalling channel between the AAL2 service endpoint and each adjacent AAL2 node 22. Under the control of the signalling server 47, a given AAL2 module 45 switches all AAL2 connections terminating on that module so that, following adaptation, they appear in the desired TDM channels on a single TDM route 48. Conversely, all TDM channels from a given TDM route terminate on a single AAL2 module where they are switched, following adaptation, on to the appropriate AAL2 VCC as determined by the signalling server. The TDM modules multiplex/de-multiplex 64 kbit/s channels to/from each TDM route.

Thus, as shown in FIG. 4, the AAL2 service endpoint provides connections between fixed sets of ATM ports and given TDM routes. The adjacent AAL2 node 42 has only sufficient routing information to route the individual AAL2 connections to the AAL2 service endpoint. It is not able to discriminate between the different AAL2 VCCs as would be required in order to place an AAL2 connection on the VCC that terminates on the desired TDM route. However, the service endpoint does have the routing knowledge to associate an incoming AAL2 VCC with an outgoing TDM route. For this purpose, the AAL2 signalling server 47 in the AAL2 service endpoint is able to negotiate with its peer (not shown) in the adjacent AAL2 node 42. The aim of the negotiate is to ensure that new incoming AAL2 connections are associated with the appropriate AAL2 VCCs and hence, with the correct TDM routes. This requires that the AAL2 signalling server be able to request, on appropriate occasions, a different path identifier than the one contained in the initial ERQ signalling message.

Case 2—AAL2 Signalling Channel pre AAL2 VCC

Figure 5:
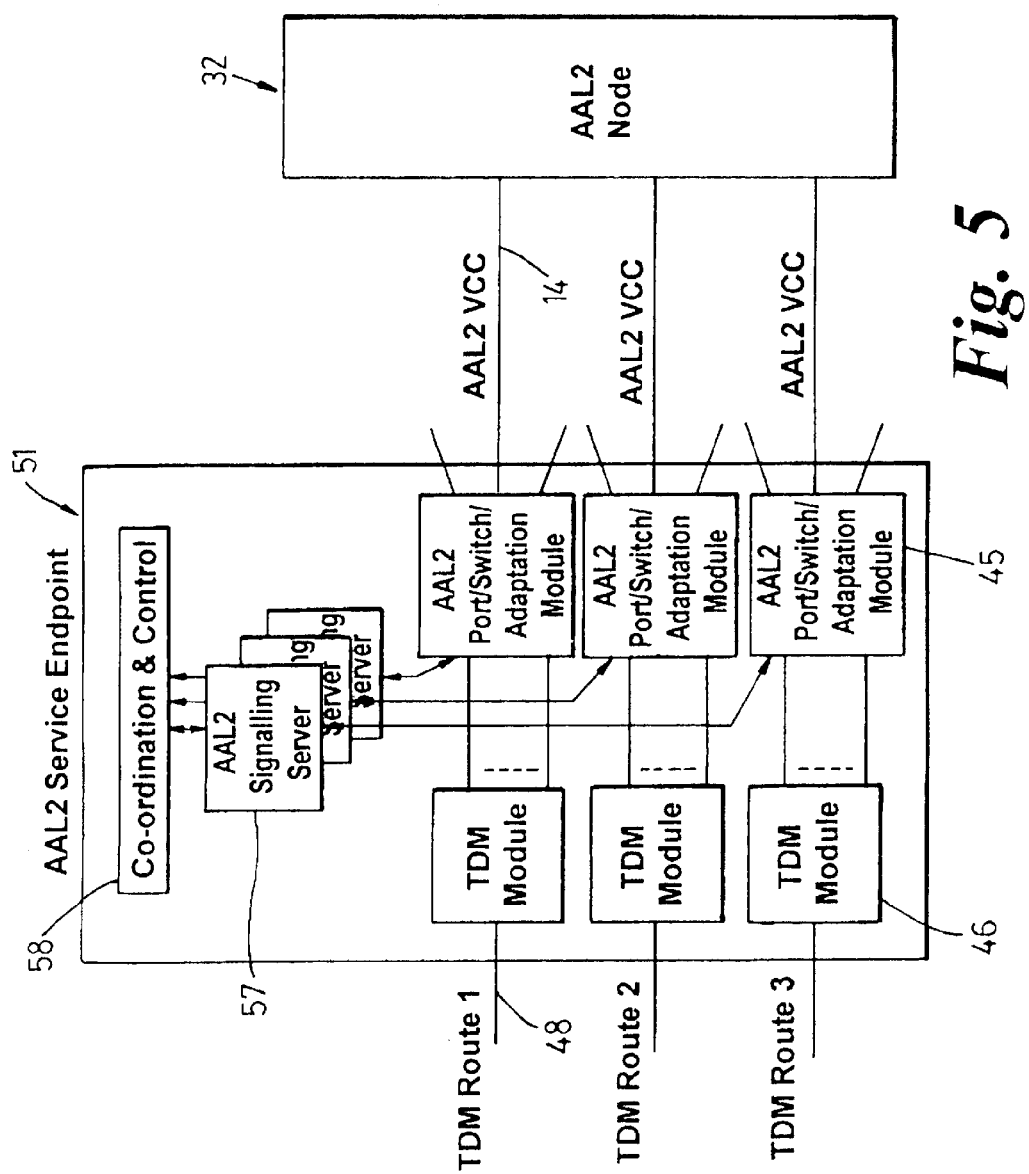
FIG. 5 shows an alternative end point construction.

FIG 5 shows an example of port isolation at an AAL2 service endpoint node 51 that terminates an AAL2 signalling channel on each AAL2 VCC 14.

The AAL2 service endpoint 51 includes a number of AAL2 port/switch/adaptation modules 45, a number of TDM modules 48, an AAL2 signalling server per AAL2 module and a co-ordination and control element 58. The AAL2 modules 45 each terminate a number of AAL2 VCCs carrying user traffic. Each AAL2 signalling server 57 handles the AAL2 signalling channels associated with the AAL2 VCCs terminated by a given AAL2 module 45. The co-ordination and control element 58 communicates with the AAL2 signalling servers 45 to control the switching of AAL2 connections terminating on the AAL2 modules. Thus, a given AAL2 module switches all AAL2 connections terminated on that module so that following adaptation, they appear in the desired TDM channels on a single TDM route 48. Conversely, all TDM channels from a given TDM route terminate on a single AAL2 module where, following adaptation, they are switched on to the appropriate AAL2 VCC as determined by the co-ordination and control element 57. The TDM modules multiplex/de-multiplex 64 kbit/s channels to/from each TDM route.

As before, the AAL2 service endpoint 51 provides connections between fixed sets of ATM ports and given TDM routes. The adjacent AAL2 node 32 requires only sufficient routing information to route the individual AAL2 connections to the AAL2 service endpoint 51. The node 32 does not need to discriminate between the different AAL2 VCCs in order to place an AAL2 connection on the VCC that terminates on the desired TDM route. However, the service endpoint 51 does require the routing knowledge to associate an incoming AAL2 VCC 14 with an outgoing TDM route 48. For this purpose, the AAL2 signalling servers 57 in the AAL2 service endpoint are able to negotiate with their peers (not shown) in the adjacent AAL2 nodes 32, as directed by the co-ordination and control element 58. The aim of negotiation is to ensure that new incoming AAL2 connections are associated with the appropriate AAL2 VCCs and hence, with the correct TDM routes. This requires that the co-ordination and control element be able to direct each AAL2 signalling server to request, on appropriate occasions, a different Path Identifier than the one contained in the initial ERQ signalling message.

Case 1—Single Signalling Channel Between Adjacent AAL2 Nodes

Figure 6:
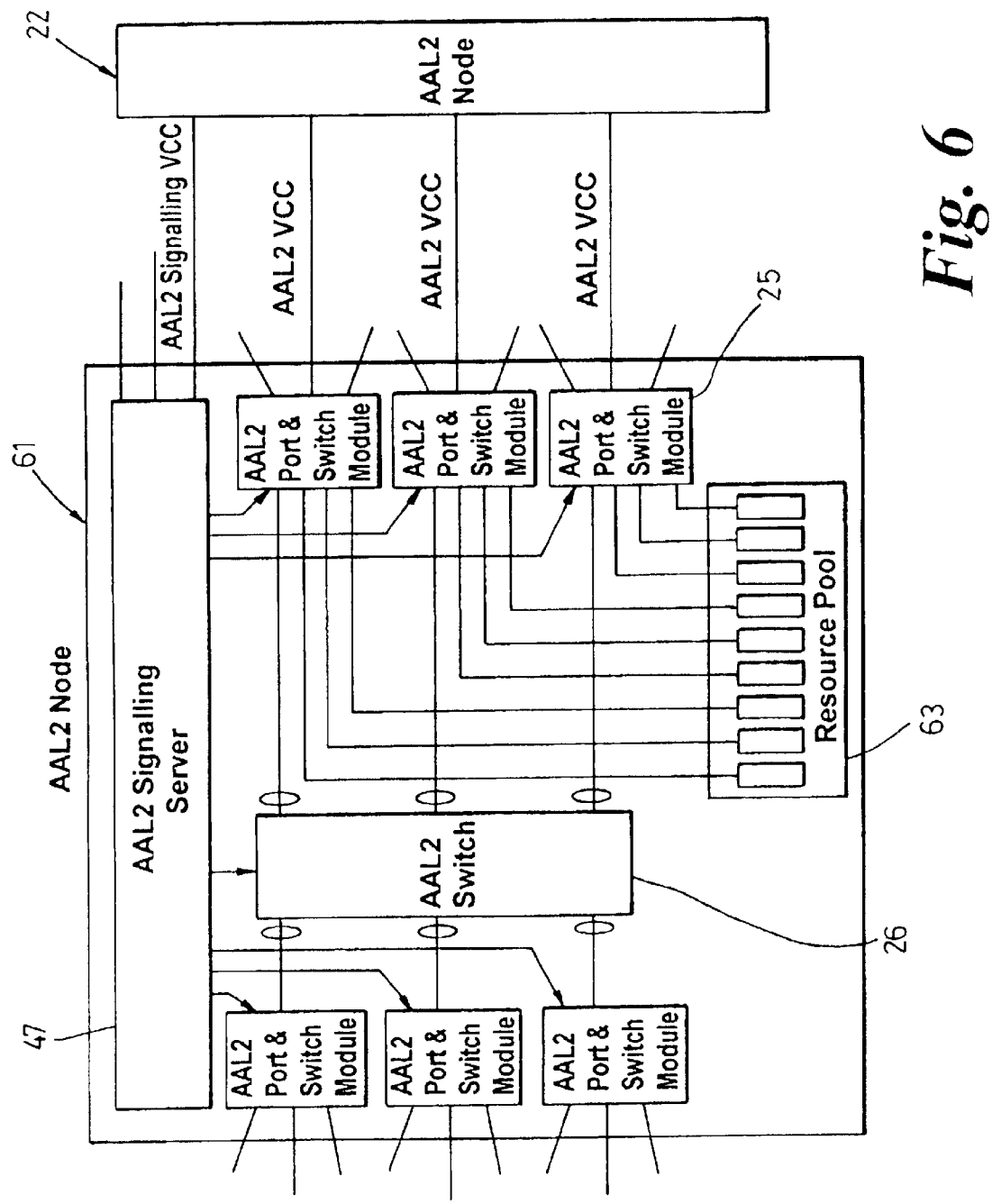
FIG. 6 illustrates the construction of a resource pooling node.

FIG. 6 illustrates an example of resource pooling at an AAL2 node 61 that terminates a single AAL2 signalling channel for each adjacent AAL2 node 22.

A means for implementing an AAL2 node as illustrated in FIG. 6 in which direct connections may be made between ports of the AAL2 port end switch modules and the ports of the resource pool without loss of connectivity. This typically removes the need for the AAL2 port and switch modules to access the resource pool via the AAL2 switch, thereby reducing the number of ports required on the node switch with concomitant reduction in cost and complexity of the said switch, while avoiding premature blocking of calls to the resource pool.

The AAL2 node is shown to include a number of AAL2 port and switch modules 25, a central AAL2 switch 26, a resource pool 63 and an AAL2 signalling server 47. The AAL2 modules 25 each terminate a number of AAL2 VCCs carrying user traffic. The AAL2 signalling server 47 handles. AAL2 signalling channels one between the AAL2 node 61 and each adjacent AAL2 node 22. Under the control of the signalling server 47, the AAL2 port and switch modules 25 switch individual AAL2 connections between the AAL2 VCCs terminated by the modules and the available inputs and outputs on the central AAL2 switch. The central AAL2 switch 26 then switches AAL2 connections between AAL2 modules, as instructed by the signalling server 47, according to the routing requirements of the individual calls.

The AAL2 port and switch modules located on the right hand side of the AAL2 node in FIG. 6 also connect a limited number of AAL2 connections to the resource pool 63 in the AAL2 node. In the exemplary embodiment of FIG. 6, only three AAL2 connections per AAL2 module are connected to the pool. The adjacent AAL2 nodes may have no knowledge of the resource pooling arrangement. These nodes only know that certain resources (e.g. tones, announcements) may be obtained from the AAL2 node at which the pool resides. They are therefore free to request any number of AAL2 connections to the pool on any of the AAL2 VCCs terminating on the AAL2 node containing the resource pool.

With only a limited number of connections to the pool, at any one time all connections to the resource pool 63 from a given AAL2 port and switch module 25 may be in use, whereas connections between other AAL2 modules and the pool may be available. Under these circumstances, a request for a new AAL2 connection to the pool that terminates on a 'busy' AAL2 module will fail. The failure may be avoided if the AAL2 signalling server in the pool node 61 is able to negotiate with its peer in the adjacent AAL2 node 22 such that the connection is re-tried on an AAL2 VCC that terminates on one of the other (non-busy) AAL2 modules 25. This requires that the AAL2 signalling server be able to request, on appropriate occasions, a different path identifier than the one contained in the initial ERQ signalling message.

Case 2—VCC Signalling Channel per AAL2 VCC

Figure 7:
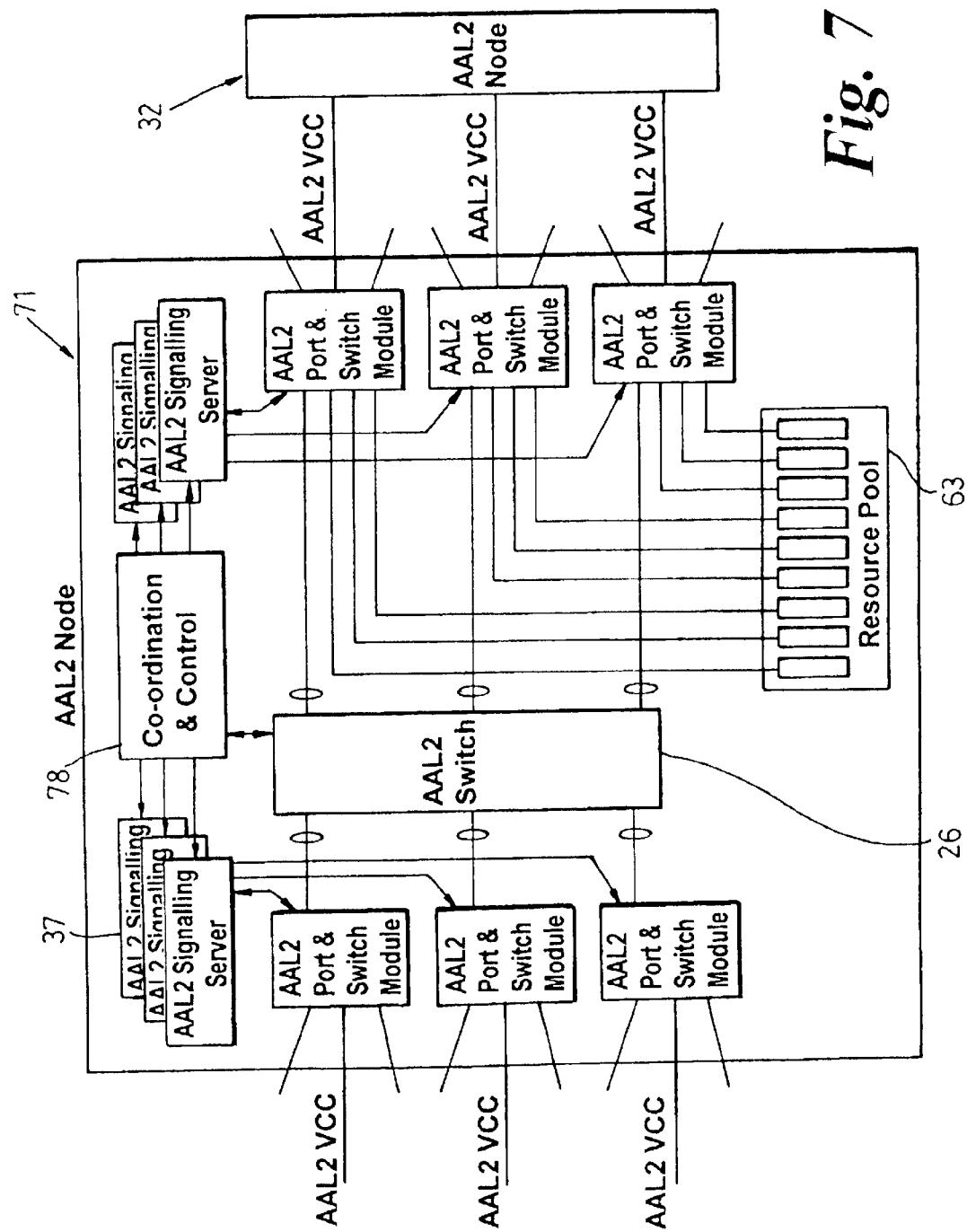
FIG. 7 illustrates an alternative construction of a resource pooling node.

FIG. 7 shows an example of resource pooling at an AAL2 node that terminates an AAL2 signalling channel on each AAL2 VCC.

The AAL2 node 71 is shown to include a number of AAL2 port and switch modules 25, a central AAL2 switch 26, a resource pool 63, AAL2 signalling servers 37, one per AAL2 port and switch module, and a co-ordination and control element 78. The AAL2 modules 25 each terminate a number of AAL2 VCCs carrying user traffic. Each AAL2 signalling server 37 handles those AAL2 signalling channels associated with the AAL2 VCCs terminated by a given AAL2 module 25. The co-ordination and control element 78 communicates with the AAL2 signalling servers 37 and the central AAL2 switch 26 to control the switching of AAL2 connections within the AAL2 node. Under the control of the signalling servers 37, the AAL2 port and switch modules 25 switch individual AAL2 connections between the AAL2 VCCs terminated by the modules and the available inputs and outputs on the central AAL2 switch. The central AAL2 switch then switches AAL2 connections between AAL2 modules, as instructed by the co-ordination and control element, according to the routing requirements of the individual calls.

As before, the AAL2 port and switch modules 25, shown on the right hand side of the AAL2 node in FIG. 7, connected a limited number of AAL2 connections to the resource pool 63 in the AAL2 node. In the exemplary embodiment of FIG. 7, only three AAL2 connections per module are connected to the pool 63. The adjacent AAL2 nodes 32 may have no knowledge of the resource pooling arrangement. These nodes only need to know that certain resources (e.g. tones, announcements) may be obtained from the AAL2 node 71 at which the resource pool resides. The adjacent nodes 32 are therefore free to request any number of AAL2 connections to the resource pool on any of the AAL2 VCCs terminating on the AAL2 node containing the resource pool.

As discussed above with reference to FIG. 6, with only a limited number of connections to the resource pool 63, at any one time all the connections to the pool from a given AAL2 port and switch module 25 may be in use whereas connections between other AAL2 modules and the pool may be available. Under these circumstances, a request for a new AAL2 connection to the pool that terminates on a 'busy' AAL2 module will fail. The failure may be avoided if the associated AAL2 signalling server 37 in the pool node 71 is able to negotiate with its peer (not shown) in the adjacent AAL2 node 32, as directed by the co-ordination and control element 78, such that the connection is re-tried on an AAL2 VCC that terminates on one of the other (non-busy) AAL2 modules. This requires that the co-ordination and control element be able to direct each AAL2 signalling server to request, on appropriate occasions, a different path identifier than the one contained in the initial ERQ signalling message.
Path Identifier Negotiation Procedure As indicated in the foregoing, the ability to negotiate the path identifier (VCC identifier) for an AAL2 connection during the connection establishment phase of an AAL2 call can be very advantageous under the number of circumstances. In the following, an exemplary negotiation procedure is outlined.

The mandatory (M), conditional (C) and optional (O) parameters of the AAL2 signalling Establishment Request (ERQ) message are as follows:

M—connection element identifier CEID
C—destination E.164 service endpoint address ESEA
C—destination NSAP service endpoint address NSEA
M—destination signalling association identifier DSAID
O—AAL2 link characteristics ALC
M—originating signalling association identifier OSAID O—served user generated reference SUGR
O—served user transport SUT
C—service specific information (audio) SSIA
C—service specific information (multi-rate) SSIM
C—service specific information (SAR-assured) SSISA
C—service specific information (SAR-un-assured) SSISU
O—test connection identifier TCI.

Figure 8:
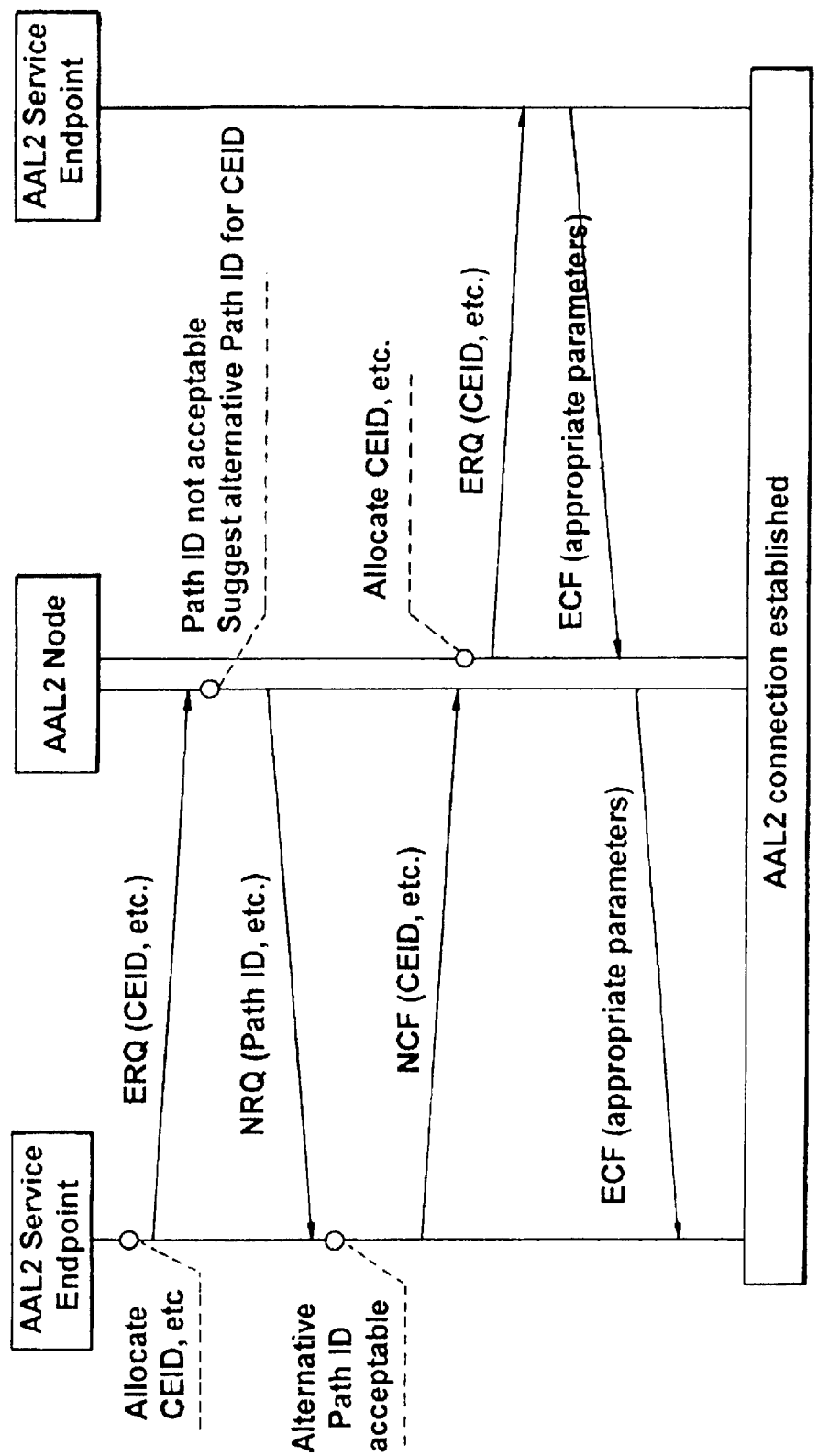
FIG. 8 is a messaging diagram illustrating path identifier negotiation initiated by an intermediate node.

Of the above parameters, the only one to which negotiation can sensibly be applied is CEID; there is no point in attempting to negotiate any of the others. Thus, an AAL2 'Negotiation' signalling message can only apply logically to the CEID parameter. Given this, a set of negotiation procedures is included in the following to demonstrate the principles involved in negotiation of the Path Identifier within the CEID parameter.
Successful Path Identifier Negotiation
Negotiation Initiated by an Intermediate AAL2 Node FIG. 8 is a messaging diagram showing an example of AAL2 signalling message sequences for successful negotiation of the path identifier within the CEID parameter, as initiated by an intermediate AAL2 node. Referring to FIG. 8, the sequence begins when an Establish Request (ERQ) message, containing the appropriate parameters including CEID (connection element identifier), is sent from an AAL2 service endpoint to an adjacent peer AAL2 node. The adjacent peer AAL2 node decides that the selected path of the chosen CEID is not acceptable and that the call can only progress if an alternative path identifier is negotiated. Accordingly, the AAL2 node returns a Negotiation Request (NRQ) message to the AAL2 service endpoint carrying the request for a different path identifier. The NRQ message is sent on the same AAL2 signalling channel as the original ERQ message.

The requested path identifier is acceptable to the AAL2 service endpoint, in which case it returns a Negotiation Confirm (NCF) message containing the path identifier and the CID value within the CEID parameter (plus any other required parameters) to the adjacent AAL2 node. Note that, in the case of an AAL2 signalling channel per AAL2 VCC, the NCF message is returned on the AAL2 signalling channel associated with the AAL2 VCC identified by the requested path identifier.

The call establishment then continues normally with an ERQ message from the adjacent AAL2 node to the destination service endpoint. The letter accepts the call and responds with an Establish Confirm (ECF) message that propagates back to the originating service endpoint. Again, in the case of a signalling channel per AAL2 VCC, the ECF message is returned to the originating service endpoint on the AAL2 signalling channel associated with the VCC identified by the Path Identifier agreed for the call. The call attempt is thus successful and at this point, the AAL2 connection is established.
Negotiation Initiated by AAL2 Service Endpoint FIG. 9 is a messaging diagram showing an example of AAL2 signalling message sequences for successful negotiation of the path identifier within the CEID parameter, as initiated by an AAL2 service endpoint.

Figure 9:
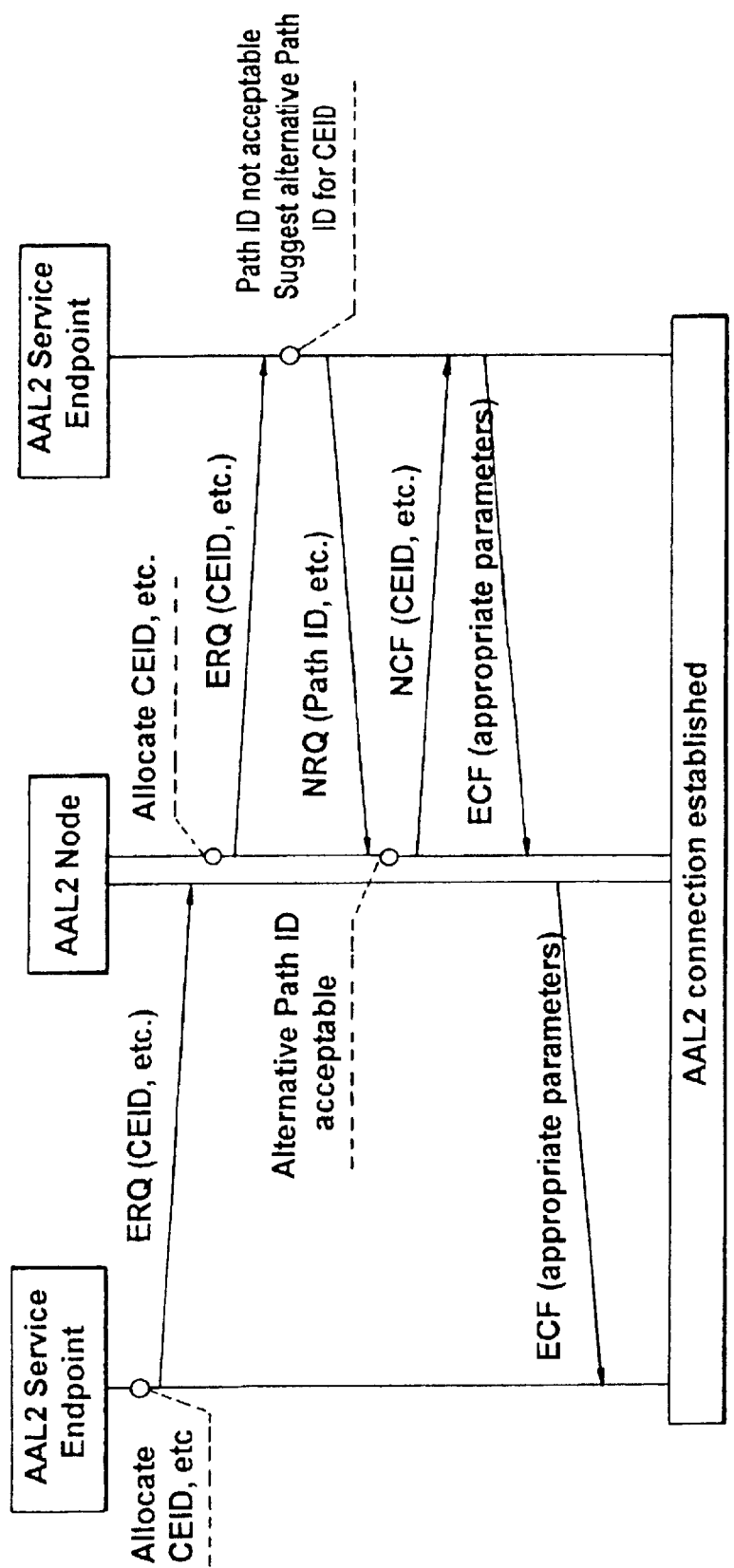
FIG. 9 is a messaging diagram illustrating path identifier negotiation initiated by a service endpoint.

Referring to FIG. 9, the sequence begins when an Establish Request (ERQ) message, containing the appropriate parameters including CEID(connection element identifier), is sent from an originating AAL2 service endpoint to an adjacent peer AAL2 node. The adjacent peer AAL2 node accepts the ERQ message, selects the appropriate parameters including CEID, and propagates the message onward to the destination AAL2 service endpoint. The destination AAL2 service endpoint decides that the selected path of the chosen CEID is not acceptable and that the call can only progress if an alternative path identifier is negotiated. Accordingly, the AAL2 service endpoint returns a Negotiation Request (NRQ) message to the adjacent AAL2 node, carrying the request for a different path identifier. The NRQ message is sent on the same AAL2 signalling channel as the original ERQ message.

The requested path identifier is acceptable to the adjacent AAL2 node, in which case it returns a Negotiation Confirm (NCF) message containing the path identifier and CID value within the CEID parameter (plus any other required parameters) to the destination AAL2 service endpoint. Note that, in the case of an AAL2 signalling channel per AAL2 VCC, the NCF message is returned on the AAL2 signalling channel associated with the AAL2 VCC identified by the requested path identifier.

The call establishment then continues normally with an Establish Confirm (ECF) message carrying the appropriate parameters from the destination service endpoint that propagates back to the originating service endpoint. Again, in the case of a signalling channel per AAL2 VCC, the ECF message is returned from the destination service endpoint on the AAL2 signalling channel associated with the VCC identified by the path identifier agreed for the call. The call attempt is thus successful and at this point, the AAL2 connection is established.

Unsuccessful Path Identifier Negotiation

Negotiation Initiated by an Intermediate AAL2 Node

Figure 10:
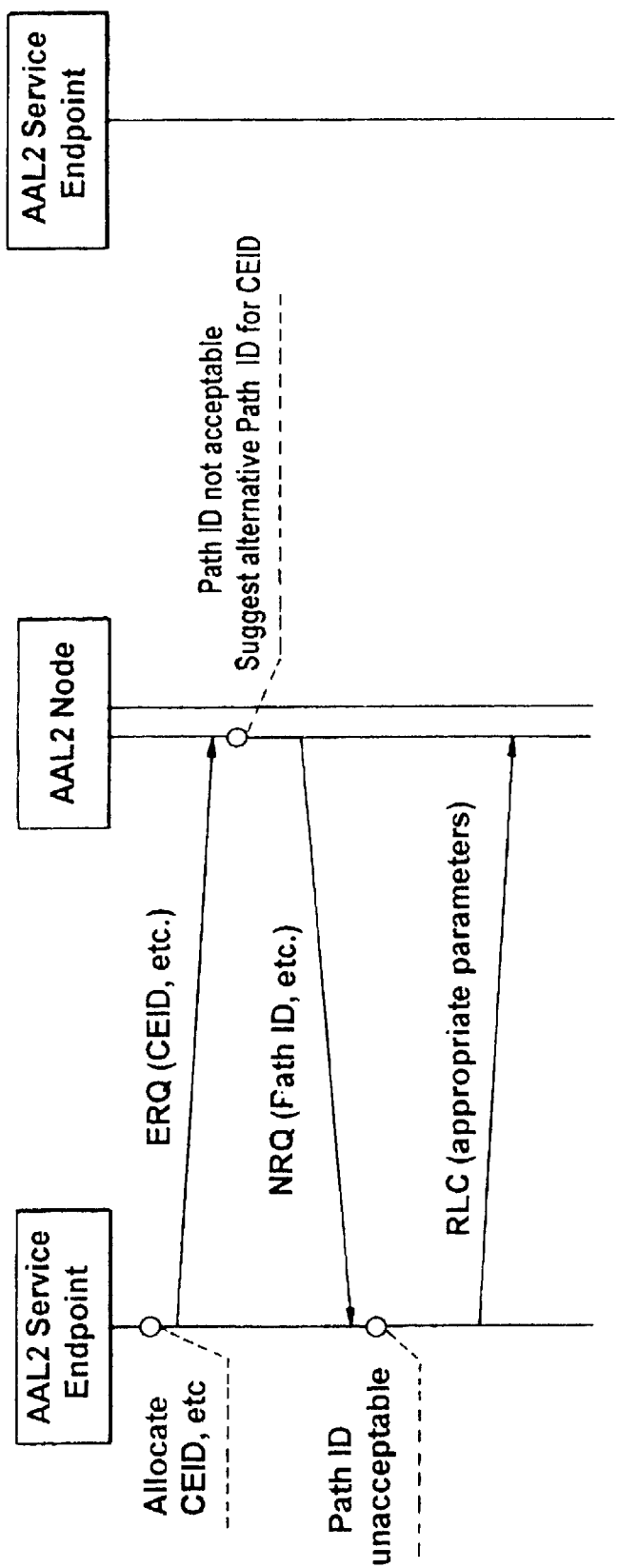
FIGS. 10 and 11 illustrate aborted negotiation procedures.

By way of comparison with the messaging sequences described above with FIGS. 8 and 9, FIGS. 10 and 11 illustrate failed attempts at path identifier negotiation. FIG. 10 shows the AAL2 signalling message sequences resulting from a failed attempt at path identifier negotiation initiated by an intermediate AAL2 node.

As before, an Establish Request (ERQ) message is sent from an originating AAL2 service endpoint to an adjacent peer AAL2 node. The path identifier within the CEID parameter in the ERQ message is not acceptable to the adjacent AAL2 node, which therefore attempts to negotiate an alternative path identifier. Accordingly, an NRQ message containing the suggested alternative path identifier is returned to the originating AAL2 service endpoint. The NRQ message is sent on the same AAL2 signalling channel as the original ERQ message.

The requested path identifier is not acceptable to the originating AAL2 service endpoint, in which case it sends to the adjacent AAL2 node a Release Confirm (RLC) message containing the appropriate parameters associated with the call attempt. The RLC message is sent on the same AAL2 signalling channel as the original ERQ message. The call attempt is thus unsuccessful and any resources that were reserved for the call are released.

Figure 11:
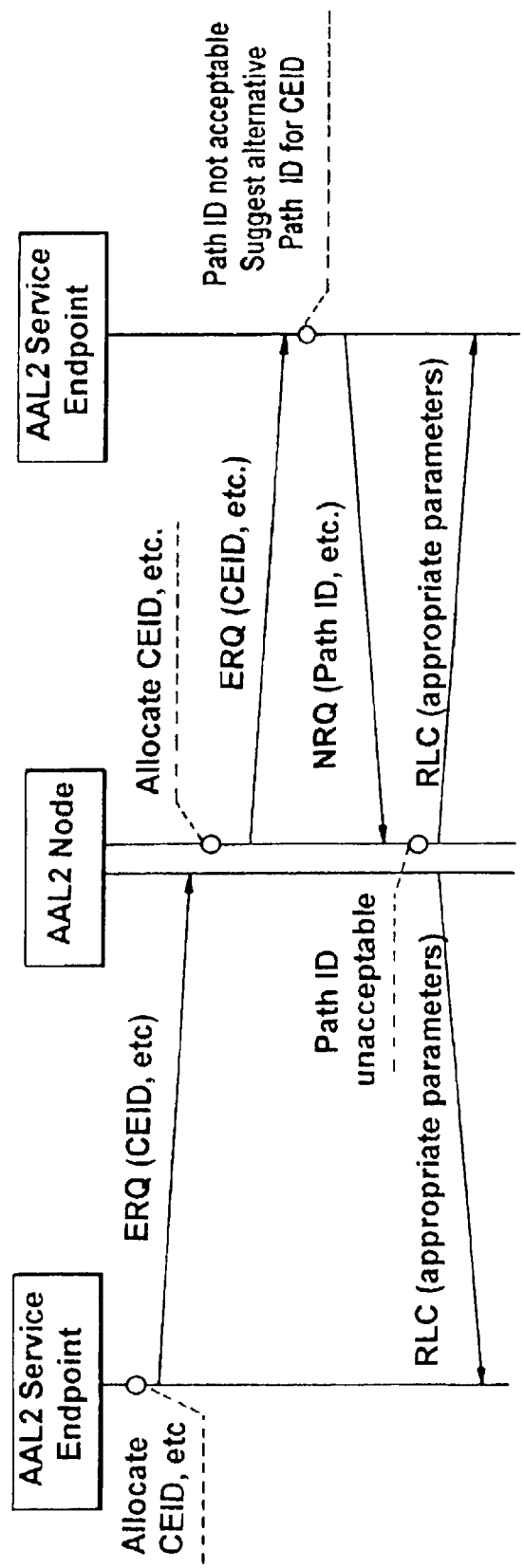

FIG. 11 shows the AAL2 signalling message sequences resulting from a failed attempt at path identifier negotiation initiated by an AAL2 service endpoint.

The sequence begins when an Establish Request (ERQ) message, containing the appropriate parameters including CEID, is sent from an originating AAL2 service endpoint to an adjacent peer AAL2 node. The adjacent AAL2 node accepts the ERQ message, selects the appropriate parameters including CEID, and propagates the message onward to the destination AAL2 service endpoint. The destination AAL2 service endpoint decides that the selected path of the chosen CEID is not acceptable and that the call can only progress if an alternative path identifier is negotiated. Accordingly, the AAL2 service endpoint returns a Negotiation Request (NRQ) message to the adjacent AAL2 node, carrying the request for a different path identifier. The NRQ message is sent on the same AAL2 signalling channel as the original ERQ message.

The requested path identifier in the NRQ message is in this example determined to be not acceptable to the adjacent AAL2 node, in which case it returns a Release Complete (RLC) message containing the appropriate parameters associated with the call attempt to the destination AAL2 service endpoint. The RLC message is sent on the same AAL2 signalling channel as the original ERQ message. The adjacent AAL2 node also returns a RLC message (with appropriate parameters) to the originating service endpoint. The call attempt is thus unsuccessful and any resources that were reserved for the call are released.

It will be understood that the above description of a preferred embodiment is given by way of example only and that various modifications may be made by those skilled in the art without departing from the spirit and scope of the invention.

We claim:

1. A method of establishing a virtual channel connection on one of a plurality of asynchronous transport mode adaptation layer 2 (AAL2) virtual circuit connections (VCCs) linking first and second nodes in a communications network, the method comprising:
   at the first node, sending a connection request to the second node, said request incorporating a path identifier for an AAL2 VCC hosting a virtual channel to be used for the connection;
   at the second node, determining whether the path identifier is acceptable to the second node for establishing the connection; and
   at the second node, where said path identifier is not acceptable to the second node, returning to the first node a negotiation request message incorporating a new path identifier for an alternative one of said AAL2 VCCs hosting a virtual channel to be used for the connection.

2. A method as claimed in claim 1, and further comprising:
   at the first node determining whether the new path identifier is acceptable to the first node for establishing the connection; and, where the new path identifier is acceptable to the first node, returning to the second node a negotiation confirm message incorporating the new path identifier to be used for the connection.

3. A method as claimed in claim 2, wherein, where said new path identifier is not acceptable to the first node, a release complete message is returned to the second node to release resources reserved for the call and to cause the call attempt to be aborted.

4. A method as claimed in claim 3, wherein at least one said nodes comprises a service endpoint.

5. A method as claimed in claim 4, wherein signalling between said first and second nodes is effected over a designated signalling channel.

6. A method as claimed in claim 1, wherein at least one of said connection request and negotiation request message comprises a channel identifier (CID) in addition to a path identifier for a respective AAL2 VCC, said CID identifying a an AAL2 channel within the AAL2 VCC identified by the path identifier.

7. A method as claimed in claim 3, wherein at least one said nodes incorporates a resource pool, said resource pool being shared between a plurality of port and switch modules.

8. A method as claimed in claim 7, wherein a new connection directed to a said port and switch module without spare capacity is re-directed to another port and switch module currently having spare capacity.

9. A method of establishing a virtual channel connection on one of a plurality of asynchronous transport mode adaptation layer 2 (AAL2) virtual circuit connections (VCCs) linking first and second nodes in a communications network, the method comprising said first and second nodes exchanging messages to determine a mutually acceptable path identifier for one of said AAL2 VCCs a to host a virtual channel to be used for the connection.

10. An arrangement for establishing a virtual channel connection on one of a plurality of asynchronous transport mode adaptation layer 2 (AAL2) virtual circuit connections (VCCs) linking first and second nodes in a communications network, the arrangement comprising first and second signalling server means disposed respectively at said first and second nodes, said signalling server means being arranged to exchange messages responsive to a connection request to determine a mutually acceptable path identifier for one of said AAL2 VCCs a to host a virtual channel to be used for the connection.

11. An arrangement for establishing a virtual channel connection on one of a plurality of asynchronous transport mode adaptation layer 2 (AAL2) virtual circuit connections (VCCs) linking first and second nodes in a communications network, the arrangement comprising:

first signalling server means at the first node for sending a connection request over a signalling channel to the second node, said request incorporating a path identifier for an AAL2 VCC hosting a virtual channel to be used for the connection;

second signalling server means at the second node for determining whether the path identifier is acceptable to the second node for establishing the connection; and, where said path identifier is not acceptable to the second node, for returning to the first node a negotiation request message incorporating a new path identifier for an alternative one of said AAL2 VCCs hosting a virtual channel to be used for the connection.

12. An arrangement as claimed in claim 11, wherein said first signalling server means at the first node includes means for determining whether the new path identifier is acceptable to the first node for establishing the connection; and, where said new path identifier is acceptable to the first node, for returning to the second node a negotiation confirm message incorporating the said new path identifier to be used for the connection.

13. An arrangement as claimed in claim 12, wherein said first signalling server means at the first node includes means for returning to the second node a release complete message to release any resources reserved for the call and to cause the call attempt to be aborted where said new path identifier is not acceptable to the first node.

14. Computer program code stored on a machine readable medium, said code being executable to control a virtual channel connection arrangement to establish a virtual channel connection on one of a plurality of ATM AAL2 VCCs linking first and second nodes in a communication network, said code being executable to perform the steps of:

at the first node, sending a connection request to the second node, said request incorporating a path identifier for an AAL2 VCC hosting a virtual channel to be used for the connection;

at the second node, determining whether the path identifier is acceptable to the second node for establishing the connection; and at the second node, where said path identifier is not acceptable to the second node, returning to the first node a negotiation request message incorporating a new path identifier for an alternative AAL2 VCC hosting a virtual channel to be used for the connection.

* * * * *

UNITED STATES PATENT AND TRADEMARK OFFICE
CERTIFICATE OF CORRECTION

| | | |
|---|---|---|
| PATENT NO. | : 6,891,833 B1 | |
| APPLICATION NO. | : 09/505474 | |
| DATED | : May 10, 2005 | |
| INVENTOR(S) | : Caves et al. | |

It is certified that error appears in the above-identified patent and that said Letters Patent is hereby corrected as shown below:

On the Title Page, Item (73), under "Assignee", delete "St. Laurent (CA)" and insert -- St. Laurent, Quebec (CA) --, therefor.

In Column 2, Line 14, delete "comprising;" and insert -- comprising: --, therefor.

In Column 2, Line 54, delete "channel" and insert -- circuit --, therefor.

In Column 3, Line 21, delete "DESCRIPTION OF PREFERRED EMBODIMENT" and insert -- DETAILED DESCRIPTION OF THE PREFERRED EMBODIMENTS --, therefor.

In Column 3, Line 49, delete "in single" and insert -- in a single --, therefor.

In Column 7, Line 27, delete "negotiate" and insert -- negotiation --, therefor.

In Column 7, Line 33, delete "pre" and insert -- per --, therefor.

In Column 7, Line 34, delete "FIG" and insert -- FIG. --, therefor.

In Column 8, Line 10, insert subheading -- Resource Pooling --.

In Column 8, Line 17, delete "end" and insert -- and --, therefor.

In Column 8, Line 21, delete "node" and insert -- AAL2 --, therefor.

In Column 8, Line 28, delete "handles." and insert -- handles --, therefor.

In Column 8, Line 64, delete "VCC" and insert -- AAL2 --, therefor.

In Column 9, Line 22, delete "connected" and insert -- connect --, therefor.

Signed and Sealed this
Twenty-third Day of August, 2011

David J. Kappos
*Director of the United States Patent and Trademark Office*

CERTIFICATE OF CORRECTION (continued)
U.S. Pat. No. 6,891,833 B1

In Column 9, Line 41, delete "fall." and insert -- fail. --, therefor.

In Column 9, Line 55, delete "under the" and insert -- under a --, therefor.

In Column 10, Line 47, delete "letter" and insert -- latter --, therefor.

In Column 12, Line 63, in Claim 6, delete "a an" and insert -- an --, therefor.

In Column 13, Line 11, in Claim 9, delete "VCCs a to" and insert -- VCCs to --, therefor.

In Column 13, Line 22, in Claim 10, delete "VCCs a to" and insert -- VCCs to --, therefor.